(12) United States Patent
Elangovan

(10) Patent No.: US 10,338,685 B2
(45) Date of Patent: *Jul. 2, 2019

(54) METHODS AND APPARATUS RECOGNITION OF START AND/OR STOP PORTIONS OF A GESTURE USING RELATIVE COORDINATE SYSTEM BOUNDARIES

(71) Applicant: Nod, Inc., Santa Clara, CA (US)

(72) Inventor: Anusankar Elangovan, San Francisco, CA (US)

(73) Assignee: Nod, Inc., Santa Clara, CA (US)

( * ) Notice: Subject to any disclaimer, the term of this patent is extended or adjusted under 35 U.S.C. 154(b) by 1045 days.

This patent is subject to a terminal disclaimer.

(21) Appl. No.: 14/697,446

(22) Filed: Apr. 27, 2015

(65) Prior Publication Data

US 2015/0301610 A1 Oct. 22, 2015

Related U.S. Application Data

(63) Continuation-in-part of application No. 14/591,878, filed on Jan. 7, 2015.

(60) Provisional application No. 61/984,548, filed on Apr. 25, 2014, provisional application No. 61/924,682, filed on Jan. 7, 2014.

(51) Int. Cl.
| | | |
|---|---|---|
| G06F 3/01 | (2006.01) | |
| G06F 3/042 | (2006.01) | |
| G06F 1/3234 | (2019.01) | |
| G06F 3/0346 | (2013.01) | |
| G06F 3/044 | (2006.01) | |

(52) U.S. Cl.
CPC ............ *G06F 3/017* (2013.01); *G06F 1/3259* (2013.01); *G06F 3/014* (2013.01); *G06F 3/016* (2013.01); *G06F 3/0346* (2013.01); *G06F 3/044* (2013.01); *G06F 3/0425* (2013.01); *G06F 2203/04104* (2013.01); *G06F 2203/04106* (2013.01); *Y02D 10/155* (2018.01)

(58) Field of Classification Search
USPC .......................................................... 345/158
See application file for complete search history.

(56) References Cited

U.S. PATENT DOCUMENTS

| | | | | |
|---|---|---|---|---|
| 9,104,271 B1* | 8/2015 | Adams | ................ | G06F 3/0426 |
| 2009/0265470 A1 | 10/2009 | Shen et al. | | |
| 2010/0267424 A1* | 10/2010 | Kim | ........................ | G06F 3/016 |
| | | | | 455/566 |
| 2011/0148789 A1* | 6/2011 | Kim | ....................... | G03B 17/54 |
| | | | | 345/173 |
| 2011/0317871 A1 | 12/2011 | Tossell et al. | | |

(Continued)

FOREIGN PATENT DOCUMENTS

WO 2013/104681 7/2013

OTHER PUBLICATIONS

Full Search Report dated Jun. 1, 2015 in corresponding PCT/US15/010533.

*Primary Examiner* — Chineyere D Wills-Burns
(74) *Attorney, Agent, or Firm* — Pillsbury Winthrop Shaw Pittman LLP

(57) ABSTRACT

Described are apparatus and methods for reconstructing a gesture by aggregating various data from various sensors, including data for recognition of start and/or stop portions of the gesture using a detection of an intersection with a relative coordinate system boundary.

40 Claims, 13 Drawing Sheets

(56) References Cited

U.S. PATENT DOCUMENTS

| | | | | |
|---|---|---|---|---|
| 2012/0075196 A1* | 3/2012 | Ashbrook | ............... | G06F 3/014 345/173 |
| 2012/0154132 A1* | 6/2012 | Lee | ......... | G06F 3/013 340/407.1 |
| 2012/0319940 A1* | 12/2012 | Bress | ...... | G06F 3/014 345/156 |
| 2013/0080811 A1* | 3/2013 | Low | ......... | G06F 3/033 713/323 |
| 2013/0285969 A1* | 10/2013 | Raffa | ............ | G06F 3/0488 345/173 |
| 2013/0290911 A1* | 10/2013 | Praphul | ............... | G06F 3/017 715/863 |
| 2014/0098018 A1 | 4/2014 | Kim et al. | | |
| 2014/0282275 A1* | 9/2014 | Everitt | ................ | G06F 3/017 715/863 |
| 2014/0368428 A1 | 12/2014 | Pinault | | |
| 2015/0047017 A1* | 2/2015 | Kim | ......... | G06F 21/32 726/19 |
| 2015/0077336 A1 | 3/2015 | Elangovan | | |
| 2015/0242002 A1* | 8/2015 | Altman | ............... | G06F 3/017 345/173 |

\* cited by examiner

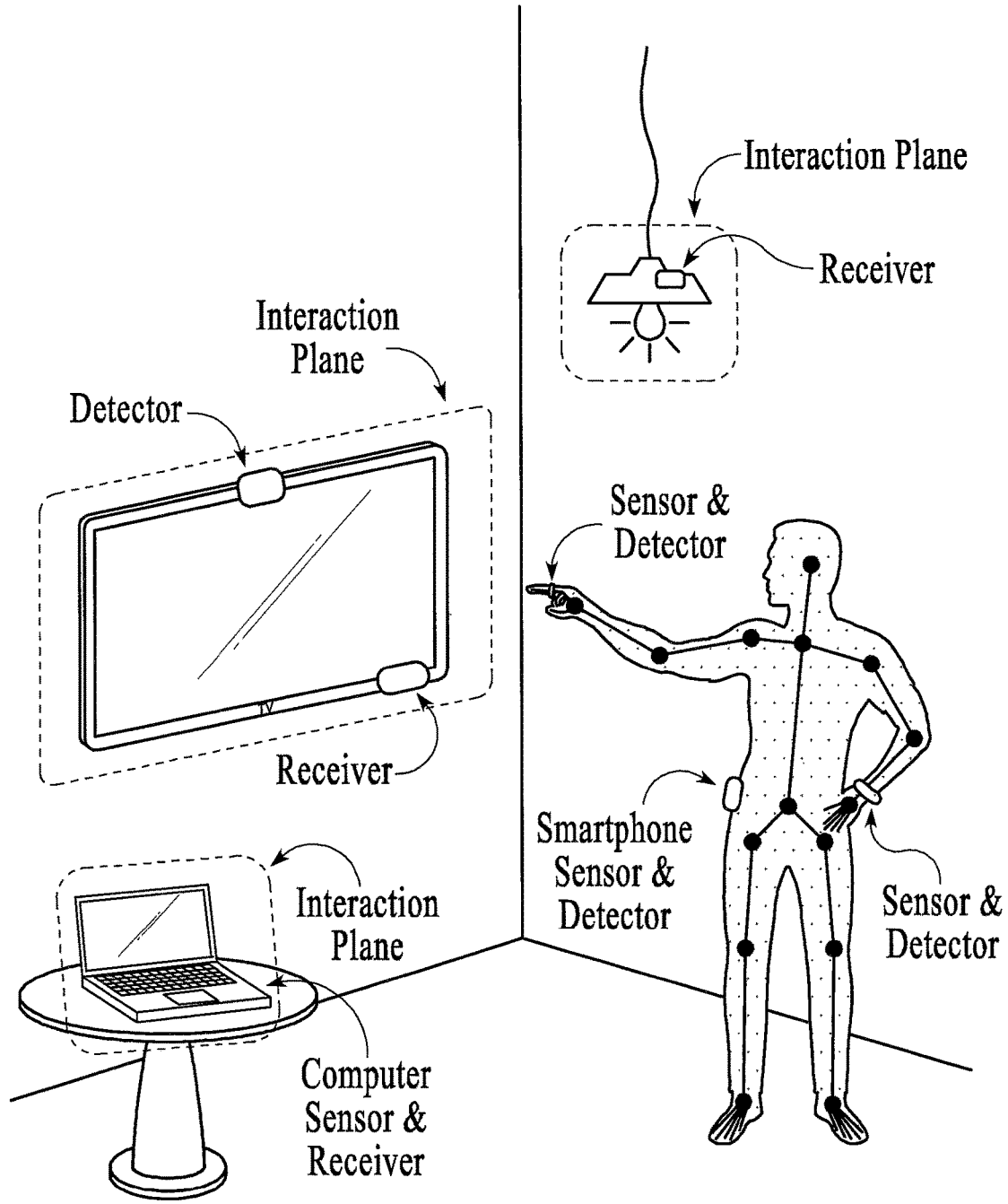
FIG. 1B/1

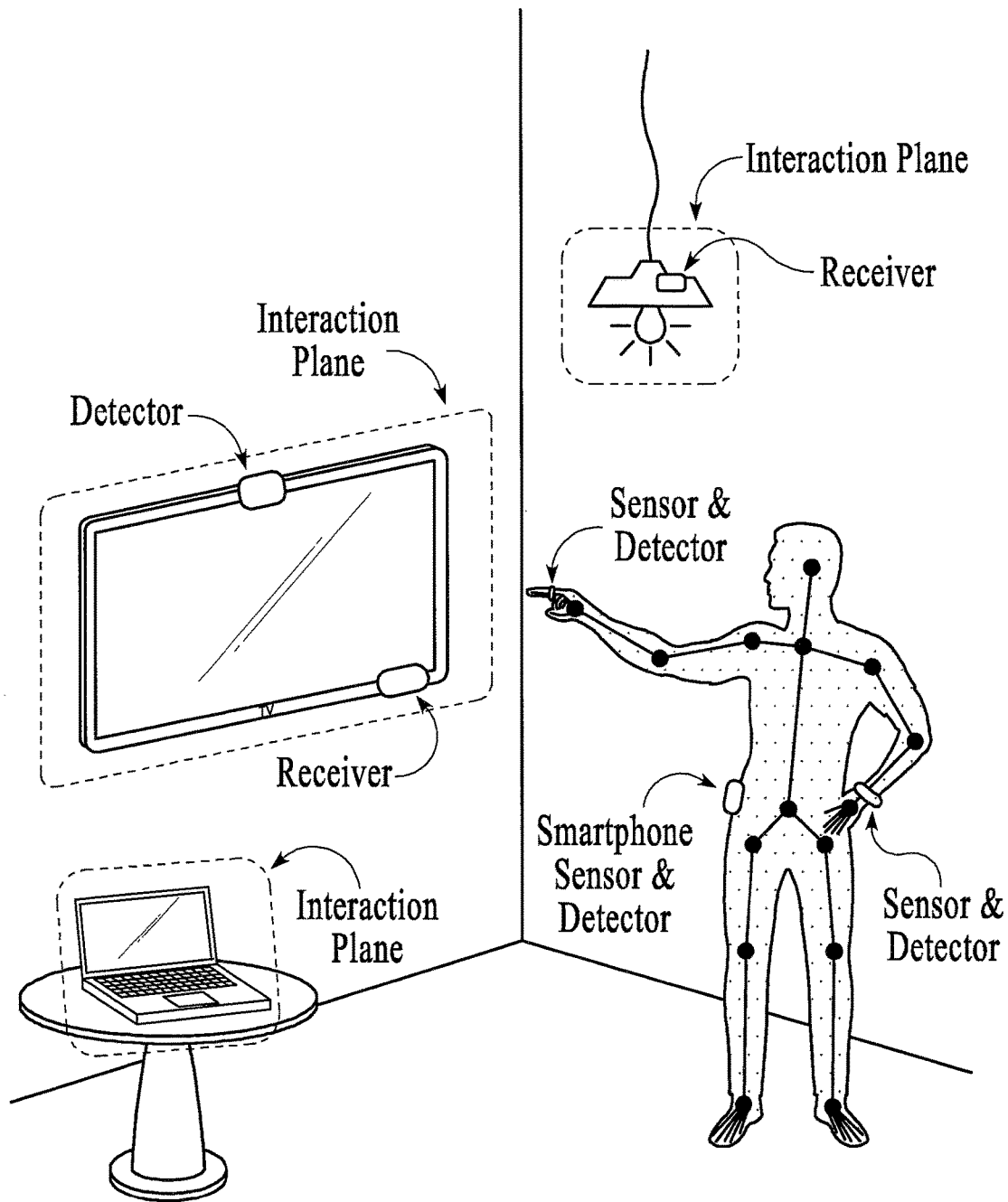
FIG. 1B/2

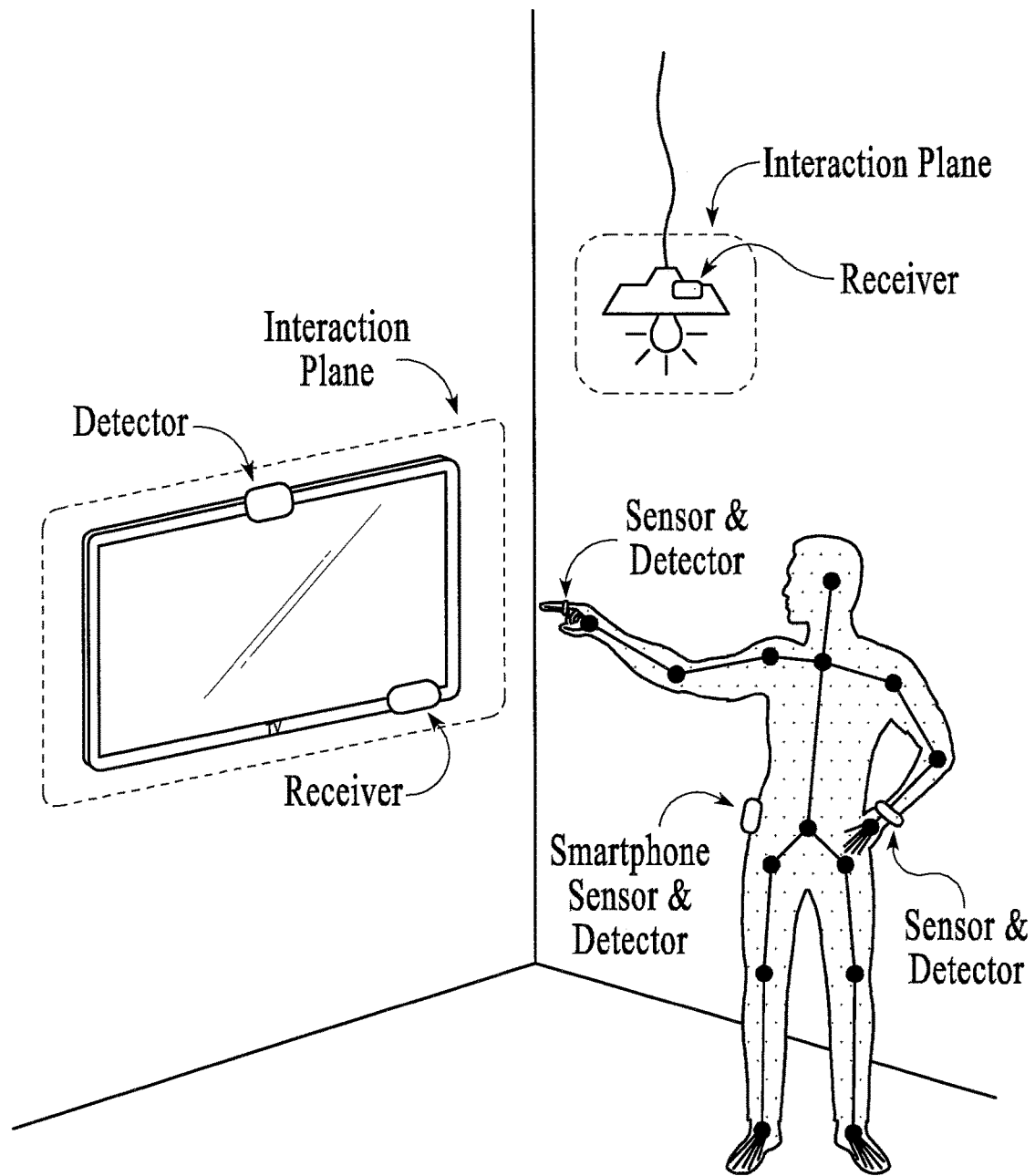
FIG. 1B/3

METHODS AND APPARATUS RECOGNITION OF START AND/OR STOP PORTIONS OF A GESTURE USING RELATIVE COORDINATE SYSTEM BOUNDARIES

RELATED APPLICATION

This application claims priority to U.S. Provisional Patent Application Ser. No. 61/984,548 filed Apr. 25, 2014 and is a continuation-in-part of U.S. application Ser. No. 14/591,878 filed Jan. 7, 2015, which claim priority to U.S. Provisional Patent Application Ser. No. 61/924,682 filed Jan. 7, 2014, each of which are expressly incorporated by reference herein.

FIELD OF THE ART

This disclosure relates to using the Human body as an Input mechanism, and, in particular, recognition of start and/or stop portions of a gesture using relative coordinate system boundaries.

BACKGROUND

Many conventional gestural systems attempt to detect gestures that resemble characters or words. Such conventional gestural systems, however, offer very poor recognition rates.

SUMMARY

Described are apparatus and methods for reconstructing a gesture in a manner that includes detecting when a user enters or leaves a boundary space associated with a relative coordinate system.

BRIEF DESCRIPTION OF THE DRAWINGS

FIG. 1(B)1 illustrates a system diagram according to an embodiment.

FIG. 1(B)2 illustrates a system diagram according to another embodiments.

FIG. 1(B)3 illustrates system diagram according to a further embodiment.

FIG. 2 illustrates that the system allows for the sensor 3 to be used for one gesture one pointing to a light (1) as shown in FIG. 2, and another gesture when pointing at the computer (2) as shown.

FIGS. 3, 4, and 5 show embodiments for micro-gesture recognition according to the embodiments.

DETAILED DESCRIPTION OF THE PREFERRED EMBODIMENT

Figure 1A:
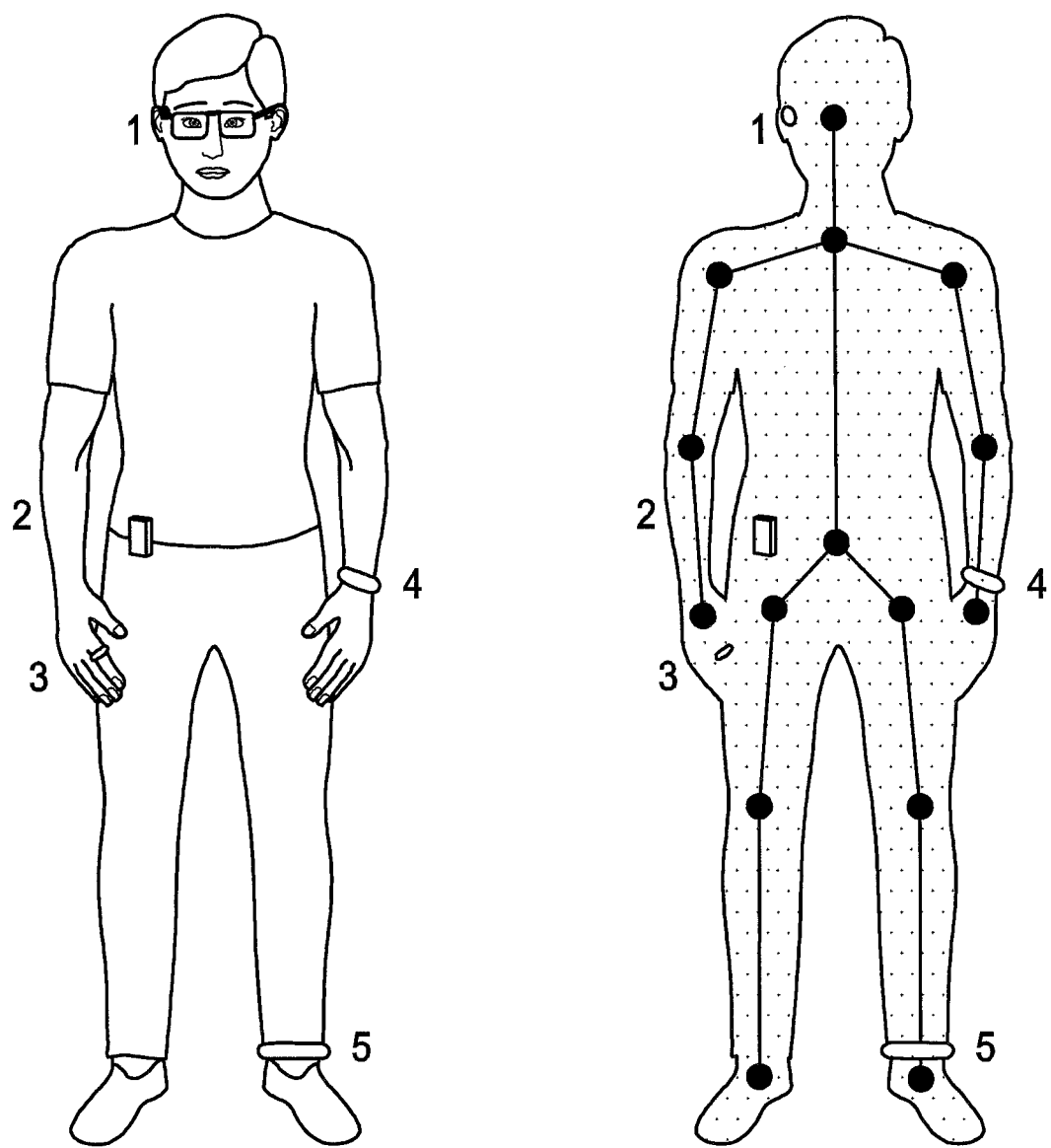
FIG. 1(A) illustrates the skeletal rendering of the human with various nodes, and the usage of many different sensors according to the embodiments.

Various devices such as computers, televisions, electronic devices and portable handheld devices can be controlled by input devices such as a computer mouse or keyboard. Various sensors such as accelerometers, gyroscopes, compasses and cameras can be collectively used (all from a substantially single point such as if disposed on a single ring; or from multiple different locations) to estimate and/or derive a gesture that is intended to have some significant meaning. These sensors dynamically provide data for varying periods of time when located in the associated space for sensing, and preferably stop or go into a low power mode when not in the associated space. When sensor data is unavailable, various calculations may be employed to reconstruct the skeletal structure without all the sensor data.

Various poses and gestures of the human skeleton over a period of time can be aggregated to derive information that is interpreted (either at the sensor or at the device) and communicated over wireless channels such as WiFi, Bluetooth or Infrared to control various devices such as computers, televisions, portable devices and other electronic devices, as described further herein and in the previously filed U.S. patent application Ser. No. 14/487,039 filed Sep. 14, 2014, which claims priority to U.S. Provisional Application No. 61/877,933 filed Sep. 13, 2013, and entitled "Methods and Apparatus for using the Human Body as an Input Device", which are explicitly incorporated herein by reference.

Described are apparatus and methods for reconstructing a gesture by aggregating various data from various sensors, including data for recognition of start and/or stop portions of the gesture using a detector that detects when a user enters or leaves a boundary space associated with a relative coordinate system.

In a preferred embodiment, sensors such as MEMS or other sensors. and preferably a plurality of them within a substantially single location such as on a ring or some other wearable form factor are used, in combination with a capacitive touch sensor or a tactile switch or sensors used for recognition of start and/or stop portions of the gesture. MEMS sensors in particular provide the advantage of not requiring a separate detector compared to conventional camera based depth sensors and don't have to be in the very restricted viewing area of a conventional depth camera. A plurality of sensors can be used to obtain further information than would be possible with a single such sensor, as described herein. When further used in combination with accelerometers, gyroscopes, compasses, the data from the various sensors can be fused and interpreted to allow for sensing of micro-gestures, as described herein.

Such a single sensing device having multiple sensors can be integrated into everyday objects such as clothing, jewelry and wearable devices like fitness monitors or augmented reality glasses in order to use of the human body as a real-time input device that can interact with a machine in its surroundings.

Processing of all the data generated to accurately detect the pose of the human body in real-time includes engineering desiderata of event stream interpretation and device power management, as well as usage of algorithms to fuse the sensor data into coherent pose estimates. The filtering algorithms used are based on the locality of the sensor and factor in the human anatomy and the joint angles of the bones the sensors are tracking. The fused data is then processed to extract micro-gestures—small movements in the human body which could signal an intent, as described herein.

Gestures such as waving your arm from one side to another or micro-gestures such as swiping your index finger from one side to another are mapped to functions, such as changing channels on a TV or advancing the song being played. More complex gestures, such as interacting with the User Interface of a tablet computer are also possible using micro-gestural primitives to generate a more complex macro intent that machines in the environment can understand. All of these gestures, however, must have start points and stop points, which need to be detected in some manner.

Thus an aspect of the system includes assembling a movement sequence (aka gesture) that could be used to indicate a command, for example, which has a start point and a stop point. Each gesture can also take on a different meaning depending on which device it is communicating with. Thus, pointing to a Television and moving your hand from one direction to another can imply changing the channel while a similar such gesture could imply changing the light intensity when done pointing to a light bulb, with each of the Television and the light bulb being separate subspaces that are detected as such by an overall detector, for example.

Efficient power management strategy is also provided, such that the sensor device doesn't require a power on or power off switch. This involves determining the current state of gestural detection and further includes the ability to turn off components such as the gestural detection unit, or various sensors to save power, and in particular using a capacitive touch sensor or a tactile switch or a specific gesture or any combination of the three as described hereinafter to accomplish certain of these power savings.

It is noted that the single sensing device is a battery-operated device, yet it does not have a power button. It does, however, have capacitive touchpads and tactile switches as described, which can be programmed to activate and/or de-activate the single sensing device, thereby ensuring that the device is in use only when the user intends for it to be and keeping it energy-efficient.

As described further herein, the detector can be located on the wearable input platform or instead be remote from it, such as a camera. If located on the wearable input platform, in association with location detection, a determination can be made that the user wants to start communicating with or no longer desires to stay communicating with the device that is within the current relative coordinate system.

This detector takes the guesswork out of the gesture acquisition engine, whereby it is not trying to interpret random gesture, unless expressly instructed to do so, via the output from the detector. Additionally, the detector ensures that the single sensing device is energy efficient and active only as needed for the duration of the interaction. Similarly, the gesture acquisition engine is not "always-on" and in use only when needed, thereby conserving energy.

Figure 2:
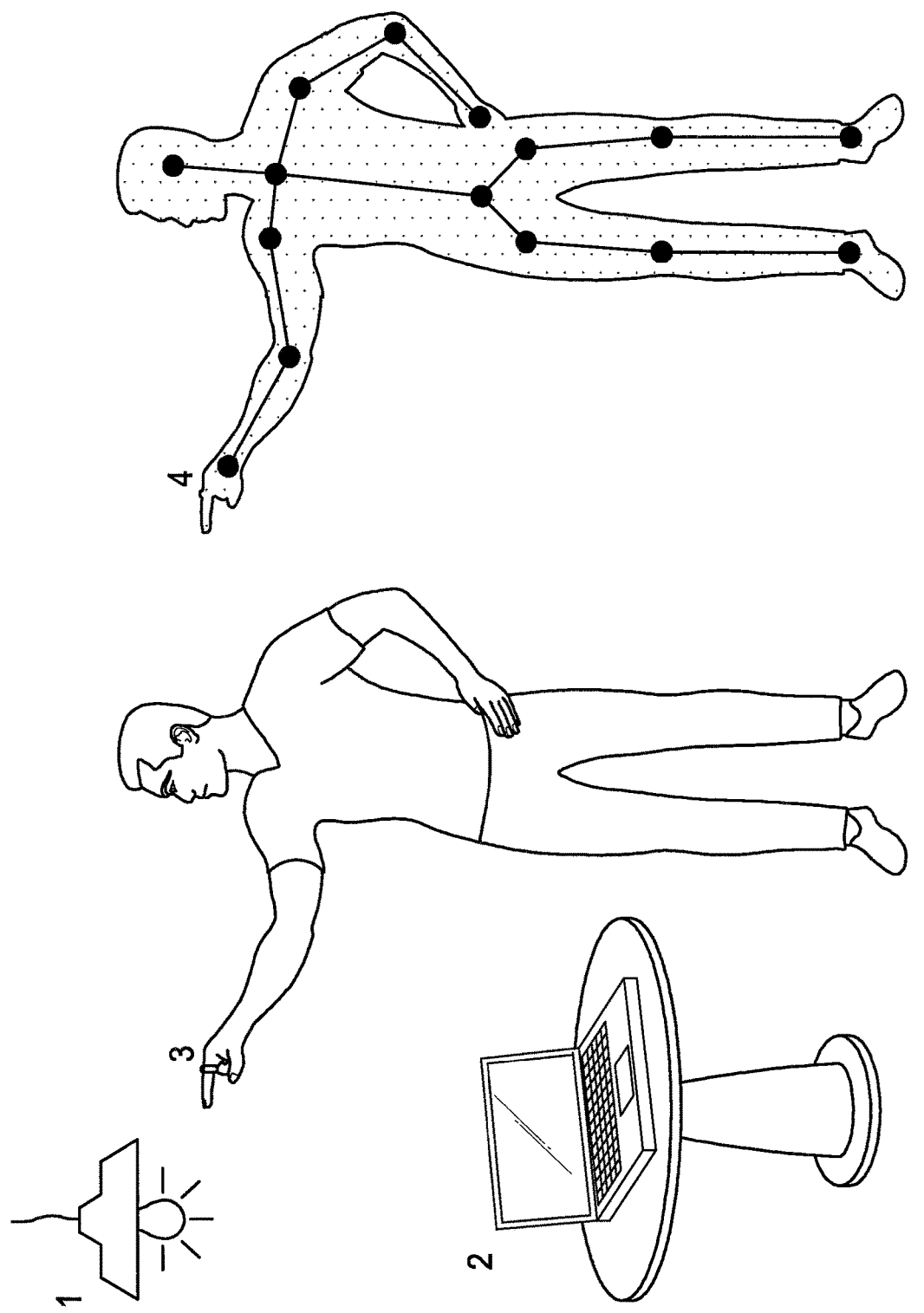
Figure 3:
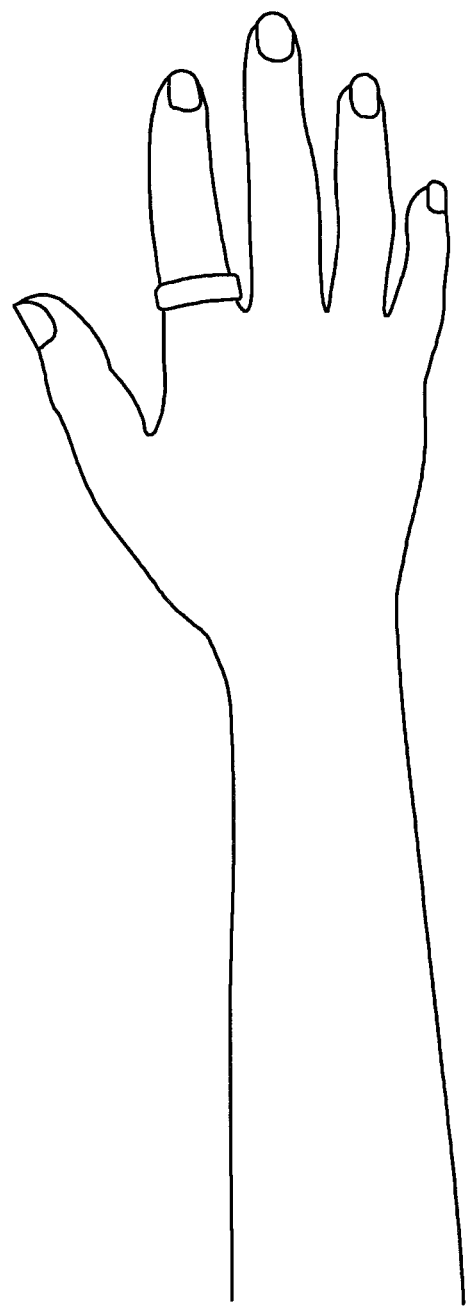

These various aspects are shown in the diagrams attached. FIG. 1(A) illustrates the skeletal rendering of the human with various nodes, and the usage of many different sensors: one on the glasses (1), another on the belt (2), a third of a number of different sensors for fingers (3), one for the wrist (4) and one on an ankle bracelet or attached to the bottom of the pants worn (5). FIGS. 1(B)(1-3) shows a similar space and rendering, and points out specific sub-spaces associated with different objects; each of which can have their own relative coordinate system if needed. As shown, FIG. 1(B)1 illustrates a system diagram with a laptop as a third controllable device, which laptop includes an interaction plane and is labeled as Computer Sensor & Receiver to illustrate that it can operate the software needed to fuse different sensor data together, as described elsewhere herein. FIG. 1(B)2 illustrates a system diagram with a laptop as well, but this laptop shown only as having an interaction plane, and operate upon a distributed system (such as with cloud processing). FIG. 1(B)3 illustrates an even simpler, which does not include the laptop at all within it. As is apparent, many different combinations are possible and within the contemplated scope herein.

As described above, the system allows for the sensor 3 to be used for one gesture one pointing to a light (1) as shown in FIG. 2, and another gesture when pointing at the computer (2) as shown.

Figure 4:
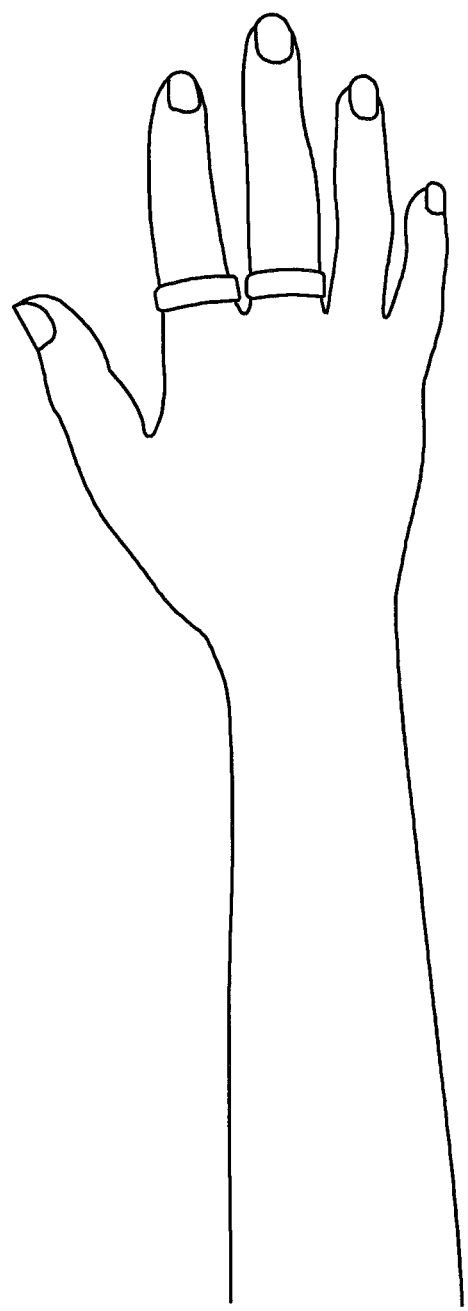
Figure 5:
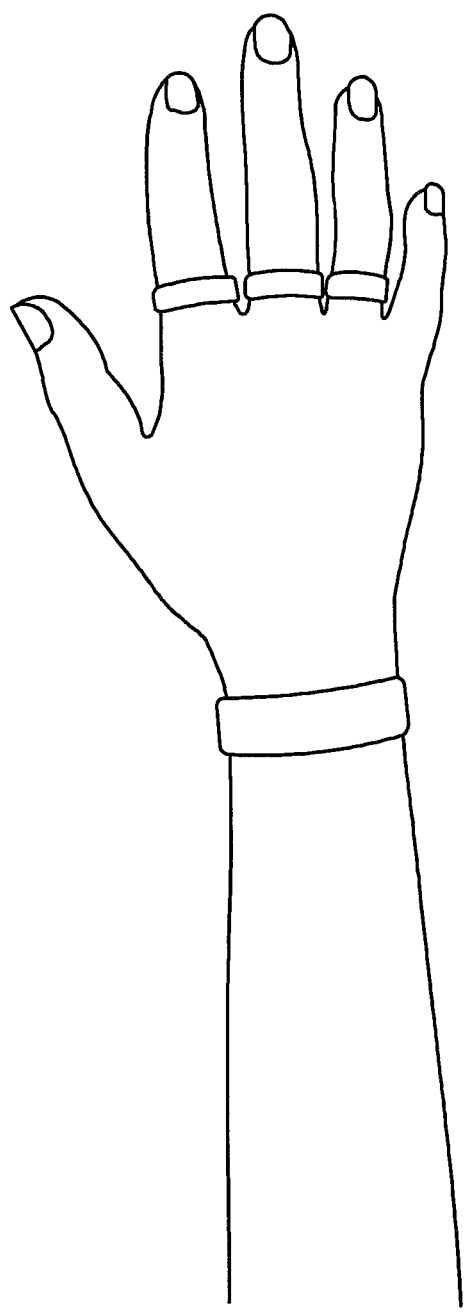

FIGS. 3, 4, and 5 show embodiments for micro-gesture recognition that include usage of 1, 2 and 3 finger rings, respectively, as shown. Other configurations are possible and within the intended scope herein.

Figure 6:
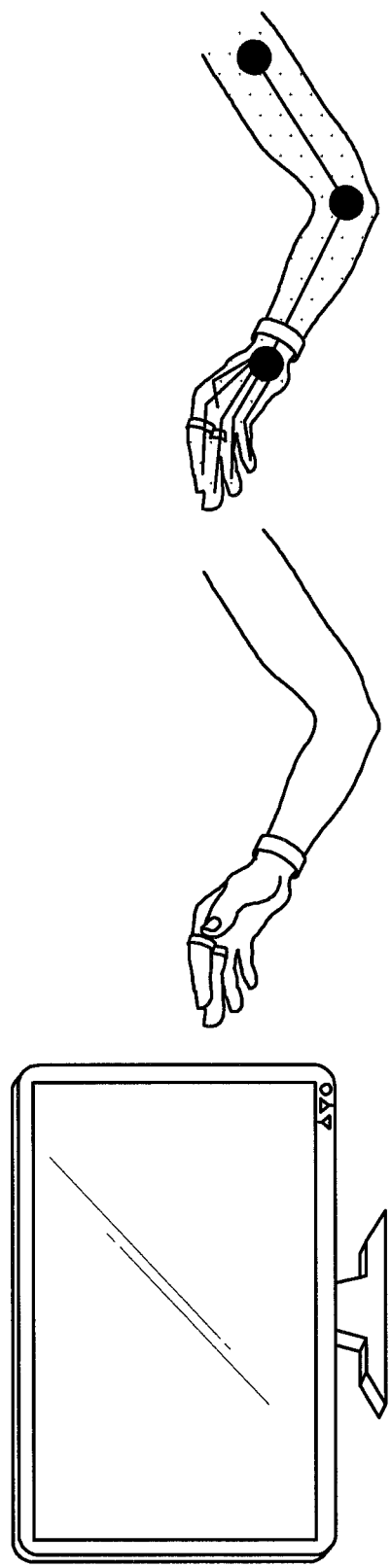
FIG. 6 shows an illustration of micro-gestures detected within a subspace that has its own relative coordinate system.

FIG. 6 shows an illustration of micro-gestures that are detected within a subspace around a computer, which subspace can have its own relative coordinate system, rather than being based upon absolute coordinates, which subspace creates a boundary around the device, such as the computer shown. In addition to the sensor data in each ring that can be used as the detector, radio strength can also be used to as the detector detect distance from a relative reference point, such as the screen of the computer. Additionally, the relative coordinate system can be based on the part of the body to which the single sensing device is attached, with a ring on a finger having as a relative coordinate system the portion of the arm from the elbow to the wrist as one axis. If, for example, the user's hand enters the boundary around the computer, that can be used to start the gesture recognition, and, similarly, if the user's hand leaves the boundary around the computer, that can be used to stop the gesture recognition.

In an aspect relating to boundaries that are larger, such as pointing to a television screen or wall switch that is a larger distance away, as the body turns toward or away from each such device, that turn can similarly be detected and used to start or stop the gesture recognition.

Figure 7:
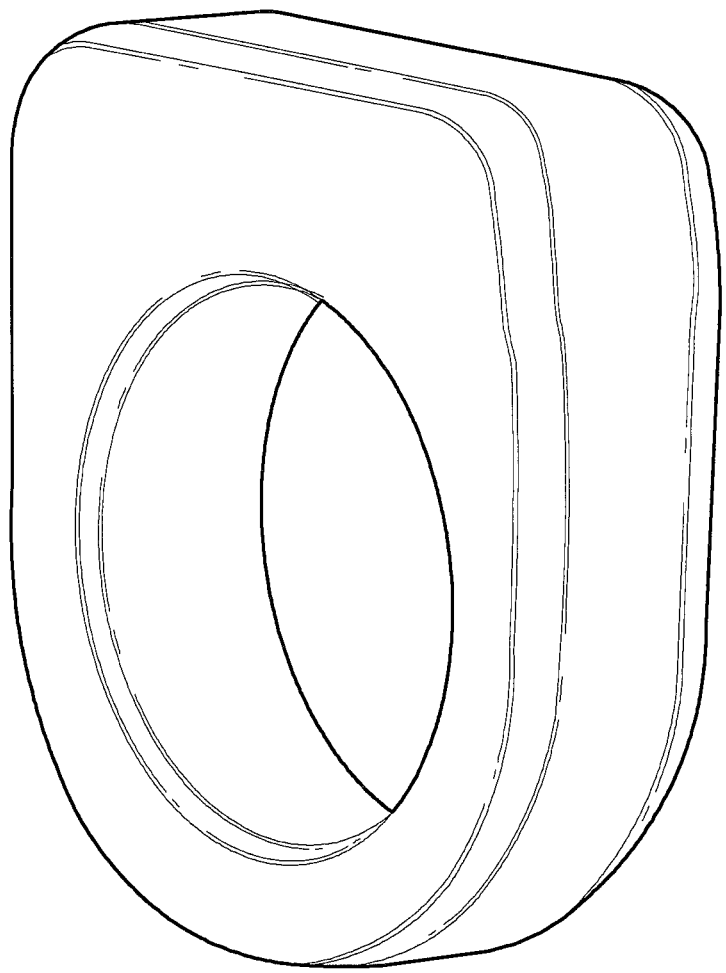
FIG. 7 illustrates a 3D exterior view of a single ring sensor.
Figure 8:
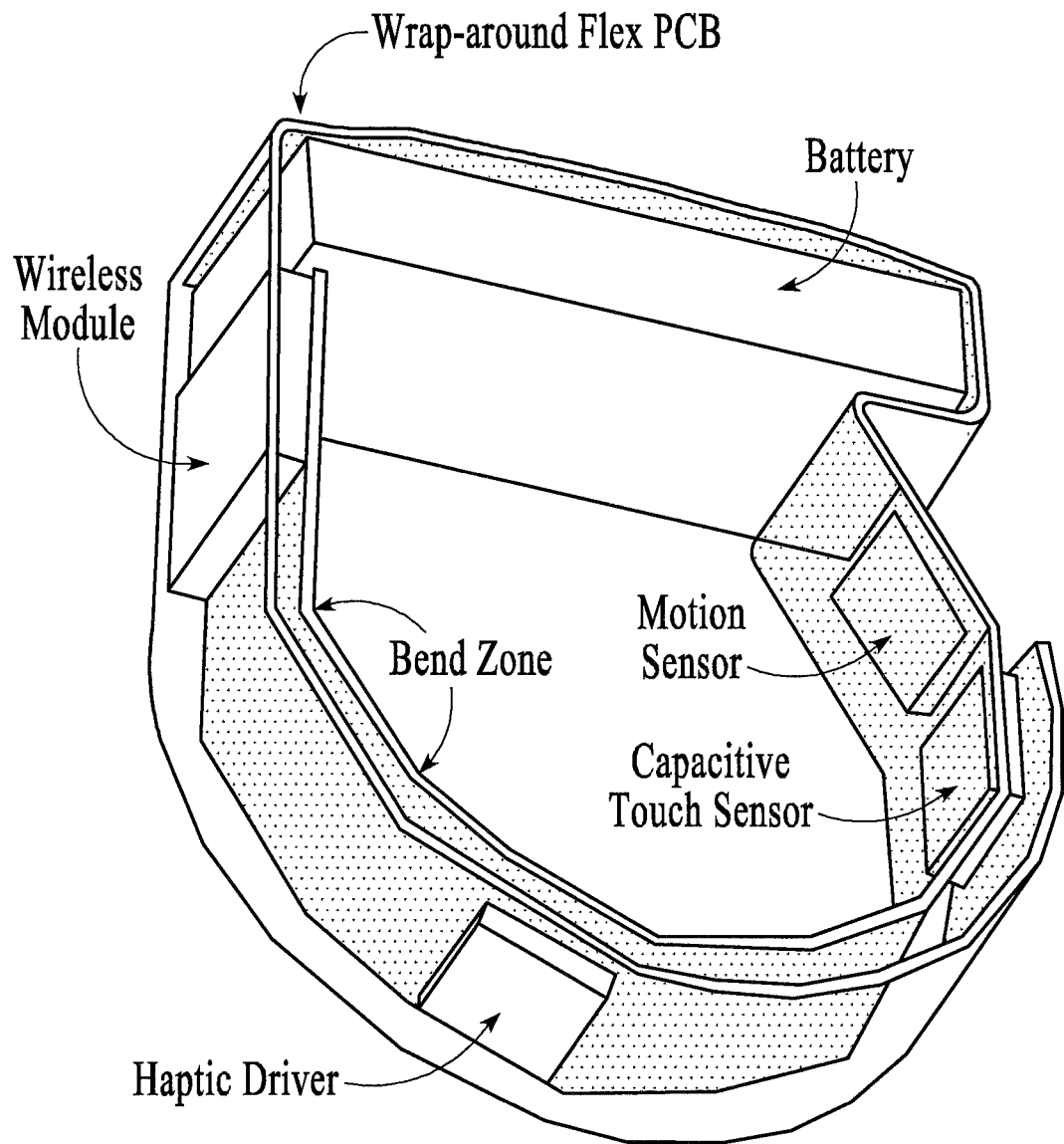
FIG. 8 illustrates a more detailed view of the ring sensor of FIG. 7.

FIG. 7 illustrates a 3D exterior view of a single ring sensor, and FIG. 8 illustrates that ring sensor in a more detailed view, with the significant electronic components identified, and which are connected together electrically as a system using a processor, memory, software as described herein, including other conventional components, for controlling the same. The processor controls the different sensors on the ring device and is in charge of detecting activity in the various sensors, fusing the data in them and sending such data (preferably fused, but in other embodiments not) to other aggregators for further processing. While shown as a ring sensor, this combination of elements can also be used for the other sensors shown in FIG. 1—though other combinations can also be used.

Figure 9:
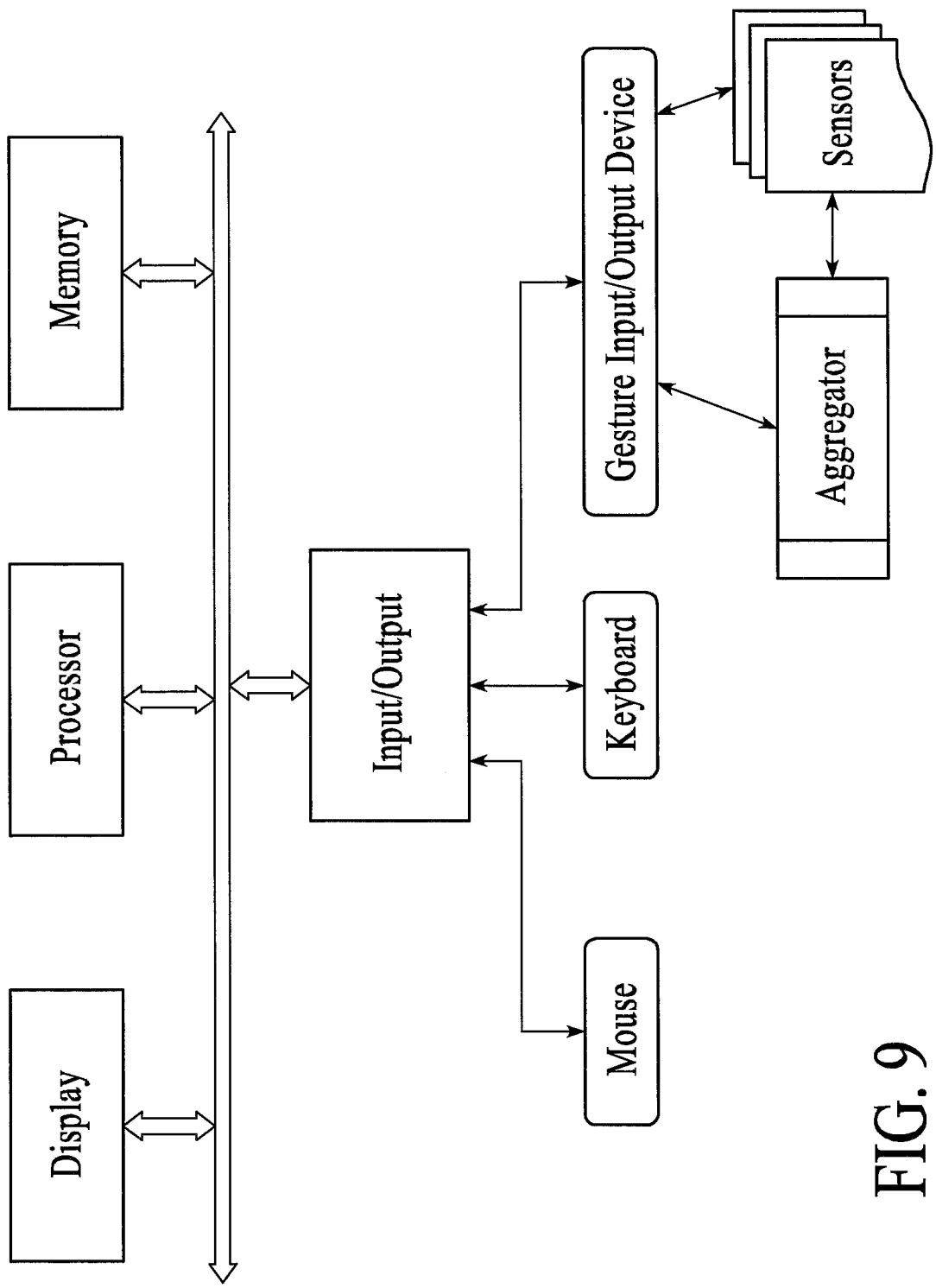
FIG. 9 illustrates a computer sensor & receiver according to the embodiments.

FIG. 9 illustrates a Computer Sensor & Receiver as shown in FIG. 1(B1). As illustrated in FIG. 9, included are a processor, memory and display that are used as is conventionally known. The processor controls the different sensors on the various devices and can fuse the data from disparate devices that has been aggregated previously or not, and send such data (preferably fused, but in other embodiments not) to other aggregators for further processing as well as send control signals based on the what has been detected to control devices such as the light or television as shown in FIG. 1. I/O devices as known are also included, as well as what is labeled a Gesture Input/Output Device and an Aggregator coupled thereto (which Aggregator may be part of the Computer Sensor and Receiver or could be located elsewhere, such as on a wrist sensor as described above). The Aggregator can be implemented in hardware or software to process the various streams of data being received from the various sensors. The Aggregator factors in location of the sensor (e.g: on the finger or wrist etc.) and calculates what data is relevant from this sensor. This is then passed on to the Gesture Input/Output Device (which could also reside across a wireless link) to control various computing devices.

The device can also possess a haptic actuator and associated circuitry to be able to provide a haptic feedback based on user engagement with a computing device. The device can also support various forms of wireless networking such as NFC, Bluetooth and/or WiFi to be able to interact with various other devices in its surroundings.

Multiple sensors can interact with each other providing a stream of individually sensed data. For example a sensor worn on the ring can communicate with a wrist worn device or a smartphone in the pocket. This data could then be aggregated on the smartphone or wrist worn device factoring in the human anatomy. This aggregation may factor in range of motion of the human skeletal joints, possible limitations in the speed human bones could move relative to each other, and the like. These factors, when processed along with other factors such as compass readings, accelerometer and gyroscope data, can produce very accurate recognition of gestures that can be used to interact with various computing devices nearby.

Figure 10:
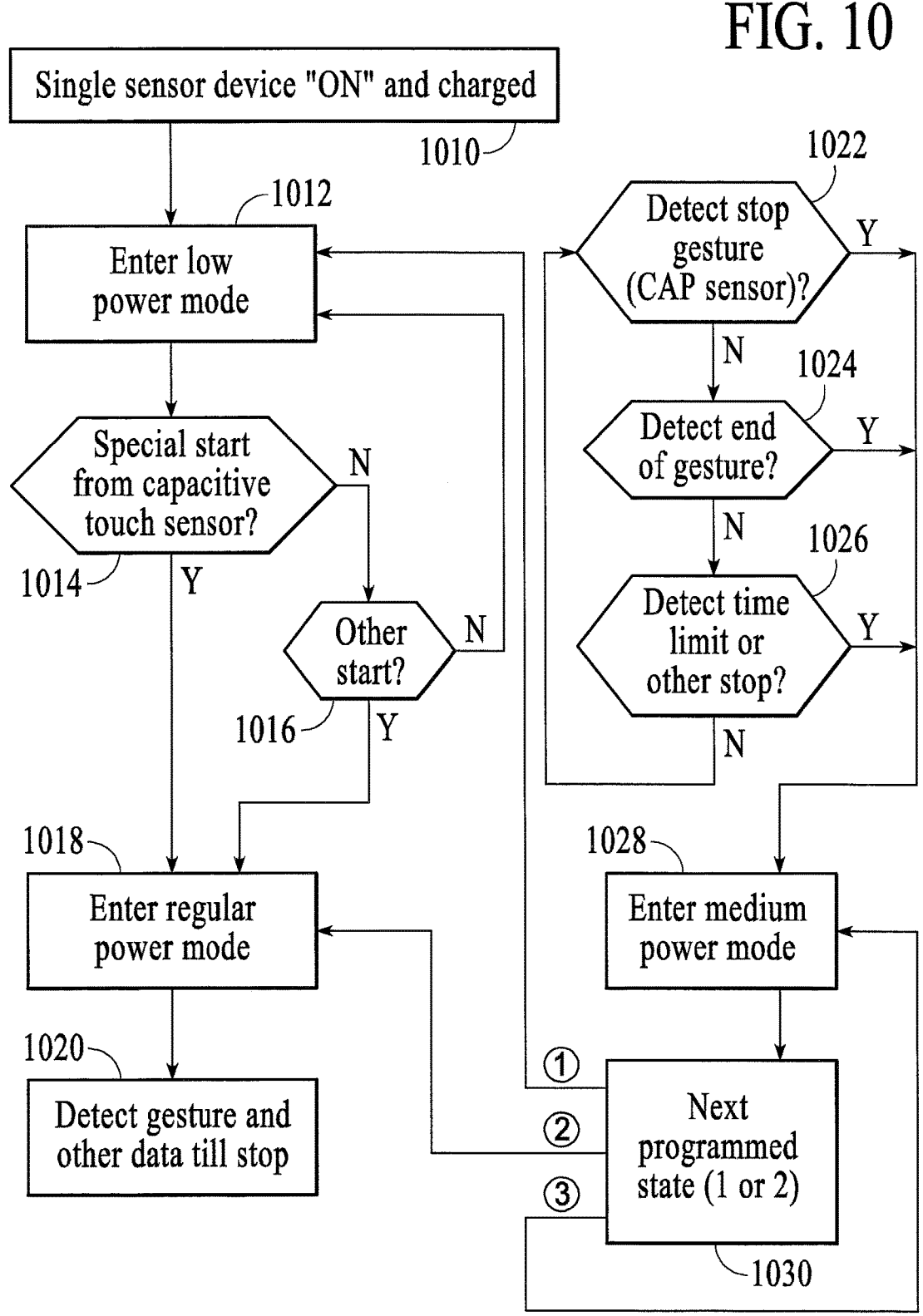
FIG. 10 illustrates a flow chart of operation using the capacitive touch sensor and low power modes.

FIG. 10 illustrates a flowchart of the preferred operation using the detector and low power modes, which is implemented in application software loaded onto the memory and executed by the processor, in conjunction with the gesture input/output device, aggregator, and sensors. For understanding, operation of a single detector is explained, but it will readily be appreciated that the same operations are used for multiple detectors.

In operation, step 1010 of FIG. 10 shows the single sensor device being in the "on" state and charged sufficiently for operation. If not charged, then a separate charging station (not shown) can be used to charge the device. After step 1010, step 1012 follows, with entry into a low power mode. In this low power mode, the minimum operations are performed, and as many of the sensors and the like are put into a sleep state in order to preserve power, with an auxiliary sensor, such as a capacitive touch sensor, being periodically awaken and scanned to see if an event has occurred, in steps 1014. Further, other start events (such as tactile or gestural input) can be programmed, and this is shown as step 1016. In a preferred embodiment, the low power mode has a tactile only input to wake up from deep sleep, and all other sensors are off, as well as wireless transmission/reception. In both the medium and low power modes, wireless transmission/reception is preferably off.

If in either of steps 1014 or 1016 a start signal is detected, then steps 1018 follows, with the single sensor device entering the regular power mode, such that full functionality is possible, though even within full mode power savings procedures can be put in place to conserve power.

One step as shown in the regular power mode is indicated as step 1020 in which gesture and other data are detected, until a stop signal is detected, such as based upon the detection that the gesture input/output device has left the relative coordinate system with which it had been communicating. Other full functionality steps can also occur, such as Processing/transforming the gestures and other sensor data such as acceleration and orientation; transmitting the processed data over a wireless medium to enable interaction with the smart device (TV, smart phone, tablet, etc.)

Steps 1022, 1024 and 1026 all follow, which are each detecting the existence of the end of the gesture. Usage of the detector to detect a specific stop gesture is shown in step 1022, whereas step 1024 shows that an end of gesture can be detected based upon the gesture data (based on a pre-programmed, unique gesture). Step 1026 indicates that a time limit or other stop trigger (such as a tactile switch) can also be used to generate the stop signal at the end of a gesture. This detector can also be used in combination with a capacitive touch sensor as described in U.S. patent application Ser. No. 14/591,878 filed Jan. 7, 2015, which claims priority to U.S. Provisional Application No. 61/924,682 filed Jan. 7, 2014, entitled "Methods and Apparatus for Recognition of Start and/or Stop Portions of A Gesture Using an Auxiliary Sensor", expressly incorporated by reference above.

Upon detection of a stop signal in any of steps 1022, 1024 and 1026, step 1028 follows, and a medium power mode is preferably entered into, in which case the, for example, no further gesture data collection is performed, the sensors are turned off, and processing of the gesture data collected already is finished using time-keeping, so as to then perform operations in accordance with such processed gesture data. Other functions that may still occur in a medium power mode, that would preferably not occur in a low power mode, are keeping all the sensors sensing (in standby) and waiting for some combination or one of touch/gesture/tactile input for quick startup.

Following step 1028 is a step 1030, in which a preferably programmed determination of whether to then enter into the low power mode 1012, the regular power mode 1018, or stay in the medium power mode 1028.

Although the present inventions are described with respect to certain preferred embodiments, modifications thereto will be apparent to those skilled in the art.

The invention claimed is:

1. An apparatus capable of interacting with at least one controllable device based upon a pose of at least a portion of a human body, the apparatus comprising:
   one or more sensors that are sized for wearing on the human body, each of the one or more sensors emitting sensor data and being packaged in an integrated mechanical assembly;
   and
   a detection unit that operates upon the sensor data to determine the pose of at least the portion of the human body and is capable of interacting with the at least one controllable device, the detection unit including:
      a memory that stores at least one or more characteristics of human anatomy that are associated with the human body using at least a partial skeletal rendering of a human; and
      a detection processor, automatically operating under software control, that inputs, aggregates and fuses the sensor data from each of the one or more sensors using the at least one or more characteristics of human anatomy stored in the memory to determine the pose of at least the portion of the human body based upon a locality of said one or more sensors, wherein the detection processor begins to input, aggregate and fuse the sensor data for gesture recognition upon certain sensor data indicating that the at least one of the one or more sensors within the integrated mechanical assembly have intersected into a relative coordinate system boundary to thereby initiate a gesture start signal and wherein the detection processor ceases to input the sensor data for gesture recognition upon receipt of a gesture stop signal.

2. The apparatus according to claim 1 wherein the gesture stop signal is generated by one of (a) other sensor data indicating that the at least one of the one or more sensors within the integrated mechanical assembly have intersected out of the relative coordinate system boundary and (b) receipt of the gesture stop signal from an auxiliary sensor sized for wearing on the human body that receives a specific input based on one of a tactile switch and capacitive touch input.

3. The apparatus according to claim 2 wherein the detection unit is also packaged in the integrated mechanical assembly.

4. The apparatus according to claim 2 wherein the gesture stop signal is generated by other sensor data indicating that the at least one of the one or more sensors within the integrated mechanical assembly have intersected out of the relative coordinate system boundary.

5. The apparatus according to claim 2 wherein the relative coordinate system boundary is related to a hand and arm, with a portion of the arm between the elbow and wrist serving as one axis of the relative coordinate system.

6. The apparatus according to claim 5 wherein the relative coordinate system boundary is associated with an electronic device disposed remote from the integrated mechanical assembly.

7. The apparatus according to claim 6 wherein a distance between at least one of the sensors on the integrated mechanical assembly and the electronic device is sensed to determine the sensor data indicating that the at least one of the one or more sensors within the integrated mechanical assembly have intersected into a relative coordinate system boundary to thereby initiate the gesture start signal.

8. The apparatus according to claim 2 wherein at least one of the gesture start signal and the gesture stop signal is triggered by a detected body turn toward or away from, respectively, an electronic device with which communication is capable.

9. The apparatus according to claim 2 wherein the relative coordinate system boundary is based on a body part to which the integrated mechanical assembly will attach.

10. The apparatus according to claim 1 wherein the relative coordinate system boundary is related to a hand and arm, with a portion of the arm between the elbow and wrist serving as one axis of the relative coordinate system.

11. The apparatus according to claim 1 wherein the relative coordinate system boundary is associated with an electronic device disposed remote from the integrated mechanical assembly.

12. The method according to claim 11 further including the step of generating the gesture stop signal from an auxiliary sensor sized for wearing on the human body and packaged within the integrated mechanical assembly, the gesture stop signal is generated by one of (a) other sensor data indicating that the at least one of the one or more sensors within the integrated mechanical assembly have intersected out of the relative coordinate system boundary and (b) receipt of the gesture stop signal from the auxiliary sensor.

13. The method according to claim 12 wherein at least one of the gesture start signal and the gesture stop signal is triggered by a detected body turn toward or away from, respectively, an electronic device with which communication is capable.

14. The method according to claim 12 wherein the relative coordinate system boundary is based on a body part to which the integrated mechanical assembly will attach.

15. The apparatus according to claim 1 wherein a distance between at least one of the sensors on the integrated mechanical assembly and the electronic device is sensed to determine the sensor data indicating that the at least one of the one or more sensors within the integrated mechanical assembly have intersected into a relative coordinate system boundary to thereby initiate the gesture start signal.

16. The method according to claim 15 wherein the relative coordinate system boundary is related to a hand and arm, with a portion of the arm between the elbow and wrist serving as one axis of the relative coordinate system.

17. The method according to claim 16 wherein the relative coordinate system boundary is associated with an electronic device disposed remote from the integrated mechanical assembly.

18. The method according to claim 17 wherein a distance between at least one of the sensors on the integrated mechanical assembly and the electronic device is sensed to determine the sensor data indicating that the at least one of the one or more sensors within the integrated mechanical assembly have intersected into a relative coordinate system boundary to thereby initiate the gesture start signal.

19. The apparatus according to claim 1 wherein at least one of the gesture start signal and the gesture stop signal is triggered by a detected body turn toward or away from, respectively, an electronic device with which communication is capable.

20. The apparatus according to claim 1 wherein the relative coordinate system boundary is based on a body part to which the integrated mechanical assembly will attach.

21. The apparatus according to claim 1 further including a timer that is used to create the gesture stop signal a predetermined period of time after generation of the gesture start signal.

22. The apparatus according to claim 1 wherein the gesture start signal is further used to change a power mode associated with the detection processor.

23. The apparatus according to claim 1 wherein the an auxiliary sensor sized for wearing on the human body that receives a first specific input based on one of a tactile switch and capacitive touch input changes the detection processor into a regular power mode and the gesture stop signal causes the one or more sensors to be turned off.

24. The apparatus according to claim 1, wherein the apparatus is further configured to interact with a first device and a second device, and wherein an orientation of the apparatus relative to the first device causes the pose to be used to signal the first device, and wherein orientation of the apparatus relative to the second device causes the pose to be used to signal the second device.

25. The apparatus according to claim 1 wherein the detection processor receives further sensor data that represents a stop time, and the gesture stop signal is generated therefrom.

26. The apparatus according to claim 1 wherein the detection processor receives further sensor data that represents a start time, and the gesture start signal is also generated therefrom.

27. The apparatus according to claim 1, wherein the portion of the human body is a finger, and wherein the integrated mechanical assembly is sized as a ring for wearing on the finger.

28. An method for interacting with at least one controllable device based upon a pose of at least a portion of a human body, the method comprising:
sensing, using one or more sensors that are sized for wearing on the human body, sensor data from each of the one or more sensors, wherein the one or more sensors are packaged in an integrated mechanical assembly; and
determining the pose of at least the portion of the human body based upon the sensor data, under processor and software control, the step of determining operating to:
associate at least one or more characteristics of human anatomy with the human body using at least a partial skeletal rendering of a human; and
automatically determine, under the processor and software control the pose of at least the portion of the human body based upon a locality of said one or more sensors and the input from the auxiliary sensor, the step of automatically determining including inputting, aggregating and fusing the sensor data from each of the one or more sensors using the at least one or more characteristics of human anatomy to determine the pose, wherein the step of automatically determining begins to input, aggregate and fuse the sensor data for gesture recognition upon certain sensor data indicating that the at least one of the one or more sensors within the integrated mechanical assembly have intersected into a relative coordinate system boundary to thereby initiate a gesture start signal and wherein the detection processor ceases to input the sensor data for gesture recognition upon receipt of a gesture stop signal.

29. The method according to claim 28 wherein the relative coordinate system boundary is related to a hand and arm, with a portion of the arm between the elbow and wrist serving as one axis of the relative coordinate system.

30. The method according to claim 28 wherein the relative coordinate system boundary is associated with an electronic device disposed remote from the integrated mechanical assembly.

31. The method according to claim 28 wherein a distance between at least one of the sensors on the integrated mechanical assembly and the electronic device is sensed to determine the sensor data indicating that the at least one of the one or more sensors within the integrated mechanical assembly have intersected into a relative coordinate system boundary to thereby initiate the gesture start signal.

32. The method according to claim 28 wherein at least one of the gesture start signal and the gesture stop signal is triggered by a detected body turn toward or away from, respectively, an electronic device with which communication is capable.

33. The method according to claim 28 wherein the relative coordinate system boundary is based on a body part to which the integrated mechanical assembly will attach.

34. The method according to claim 28 wherein a timer is used to create the gesture stop signal a predetermined period of time after generation of the gesture start signal.

35. The method according to claim 28 wherein the gesture start signal is further used to change a power mode associated with the processor.

36. The method according to claim 28 wherein the gesture start signal changes the processor into a regular power mode and the gesture stop signal causes the one or more sensors to be turned off.

37. The method according to claim 28, wherein the integrated detection unit mechanical assembly interacts with a first device and a second device, and wherein an orientation of the an integrated detection unit mechanical assembly relative to the first device causes the pose to be used to signal the first device, and wherein orientation of the apparatus relative to the second device causes the pose to be used to signal the second device.

38. The method according to claim 28 wherein the processor receives further sensor data that represents a stop time, and the gesture stop signal is generated therefrom.

39. The method according to claim 28 wherein the processor receives further sensor data that represents a start time, and the gesture start signal is also generated therefrom.

40. The method according to claim 28, wherein the portion of the human body is a finger, and wherein the integrated mechanical assembly is sized as a ring for wearing on the finger.

* * * * *